(12) United States Patent
Vincent

(10) Patent No.: US 6,359,884 B1
(45) Date of Patent: Mar. 19, 2002

(54) MODULAR SCALABLE PACKET SCHEDULER WITH RATE BASED SHAPING AND VIRTUAL PORT SCHEDULER

(75) Inventor: John Edward Vincent, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/105,469

(22) Filed: Jun. 26, 1998

(51) Int. Cl.$^7$ ................................................ H04L 12/28
(52) U.S. Cl. ........................................ 370/389; 370/428
(58) Field of Search ................................ 370/230, 235, 370/360, 363, 368, 371, 374, 378, 389, 391, 392, 397, 399, 409, 412, 411, 428

(56) References Cited

U.S. PATENT DOCUMENTS

| | | | |
|---|---|---|---|
| 5,633,859 A | 5/1997 | Jain et al. | 370/234 |
| 6,141,323 A * | 10/2000 | Rusu | |
| 6,151,321 A * | 11/2000 | Benson et al. | 370/395 |
| 6,195,331 B1 * | 2/2001 | Tani | 370/230 |
| 6,212,165 B1 * | 4/2001 | Mann et al. | 370/231 |
| 6,219,352 B1 * | 4/2001 | Bonomi et al. | 370/417 |
| 6,262,986 B1 * | 7/2001 | Oba et al. | 370/399 |

FOREIGN PATENT DOCUMENTS

| | | | |
|---|---|---|---|
| WO | WO9639759 | 12/1996 | H04J/1/16 |
| WO | WO9720415 | 5/1997 | H04L/12/56 |

* cited by examiner

Primary Examiner—Wellington Chin
Assistant Examiner—Brenda Pham

(57) ABSTRACT

A partitioned packet scheduler comprising a queue manager, an optionally connected rate shaper, and an optionally connected virtual port scheduler is provided. The packet scheduler is for use in a packet switch and has a very simple interface with the remainder of the switch consisting a channel for communicating buffer addresses and internal connection numbers. Very simple interfaces also exist between the queue manager and the rate shaper/virtual port scheduler thereby allowing independent design and update of these components to be performed.

26 Claims, 10 Drawing Sheets

MODULAR SCALABLE PACKET SCHEDULER WITH RATE BASED SHAPING AND VIRTUAL PORT SCHEDULER

FIELD OF THE INVENTION

This invention relates to the field of broadband communications. More specifically, it relates to the design of packet schedulers that are deployed within telecommunications switches.

BACKGROUND OF THE INVENTION

Packet schedulers basically maintain queues of pointers to packets that are buffered in the switch memory, and determine the times at which each buffered packet is transmitted from the switch.

A conventional packet scheduler is implemented using a single monolithic component such as an application specific integrated circuit (ASIC), or a single software system. This one-component architecture has become undesirable however, for at least two reasons. The first reason is that the feature-set that has to be supported by schedulers has become too varied to be economically implemented on a single component. More particularly, as it has become necessary to implement a wider array of new features in packet schedulers, and as it has therefore become increasingly infeasible for switch manufacturers to implement a full feature-set in every packet scheduler, the need has arisen to design a customized scheduler for each specific type of packet switch that is produced. This trend, in turn, has driven up design costs for switch manufacturers.

A second reason for the undesirability of continuing with the use of a single monolithic component to implement a scheduler, arises because the definitions, let alone the implementations, of several of the aforementioned new scheduler features have yet to be stabilized. This means that switch designers have had to frequently redesign entire schedulers every time any unstable part of the overall feature-set changes.

Partitioning of an architecture involves mapping a plurality of features that have traditionally been implemented by a single component, to a plurality of components that replace the traditional single-component. Partitioning is difficult because the process demands that several factors be simultaneously considered. These factors include the requirement of implementing the total feature-set that was implemented by the single traditional component, using the plurality of components. The factors also include the preference that each component be mapped to a set of features whose implementations tend to change at the same time. Such mappings reduce upgrade costs for the entire architecture.

Another factor to be considered in partitioning an architecture is the desirability of mapping each set of features required to provide a single service, to the same component. Partitioned architectures that achieve this goal are hereinafter referred to as architectures that are partitioned along service-lines.

Another factor to consider in partitioning an architecture, is the desire that the resulting components be decoupled from one another. Conventional telecommunication switch designs are constituted by components that are coupled to one another. Generally, the coupling of one component to another occurs when the designs of the components are highly interdependent on each other, such that one component cannot be changed without also changing the other. Coupling is generally undesirable as it prevents components from being developed independently of each other. Coupled components are decoupled from one another by implementing well-defined and simple interfaces between them, that do not have to change as the implementation of either of the components changes.

SUMMARY OF THE INVENTION

It is an object of this invention to obviate and/or mitigate one or more of the above-identified disadvantages.

According to a first broad aspect, the invention provides a packet scheduler for use in a packet switch having a cell memory, the packet scheduler comprising a queue manager hardware block (QM) for maintaining a queue of packet identifiers for each of a plurality of internal connection numbers, each packet identifier corresponding to a packet that is buffered at a respective buffer address of the cell memory within the switch, and for determining the time at which each buffered packet is to be transmitted from the switch, the QM having a switch interface for communicating internal connection numbers and buffer addresses to and from the packet switch; and the QM having a rate shaper interface for sending and receiving internal connection numbers and TDQ (traffic descriptor queue) identifiers.

According to a second broad aspect, the invention provides a packet scheduler for use in a packet switch having a cell memory, the packet scheduler comprising: a queue manager hardware block (QM) for maintaining a queue of packet identifiers for each of a plurality of internal connection numbers, each packet identifier corresponding to a packet that is buffered at a respective buffer address of the cell memory within the switch, and for determining the time at which each buffered packet is to be transmitted from the switch, the QM having a switch interface for communicating internal connection numbers and buffer addresses to and from the packet switch; and the QM having a virtual port scheduler interface for sending and receiving TDQ identifiers.

According to a third broad aspect, the invention provides A method of scheduling packets comprising the steps of: (a) maintaining a credit-count for each of a plurality of internal connection numbers (ICN); (b) upon receipt of a buffer address and a particular ICN enqueueing a packet identifier that is associated with the buffer address in a per-connection queue (PCQ) that is associated with the particular ICN and enqueueing the ICN in an associated traffic descriptor queue (TDQ) only when another copy of the given ICN is not already enqueued on the TDQ, and when the ICN's credit-count is exceeding a predetermined threshold; and (c) dequeueing the given ICN from the TDQ by reading a packet identifier from the ICN's PCQ, looking up the BADR, and outputting the ICN and the BADR.

BRIEF DESCRIPTION OF THE DRAWINGS

Embodiments of the invention will now be disclosed with reference to the accompanying drawings, in which.

DETAILED DESCRIPTION OF THE PREFERRED EMBODIMENTS

Figure 1:
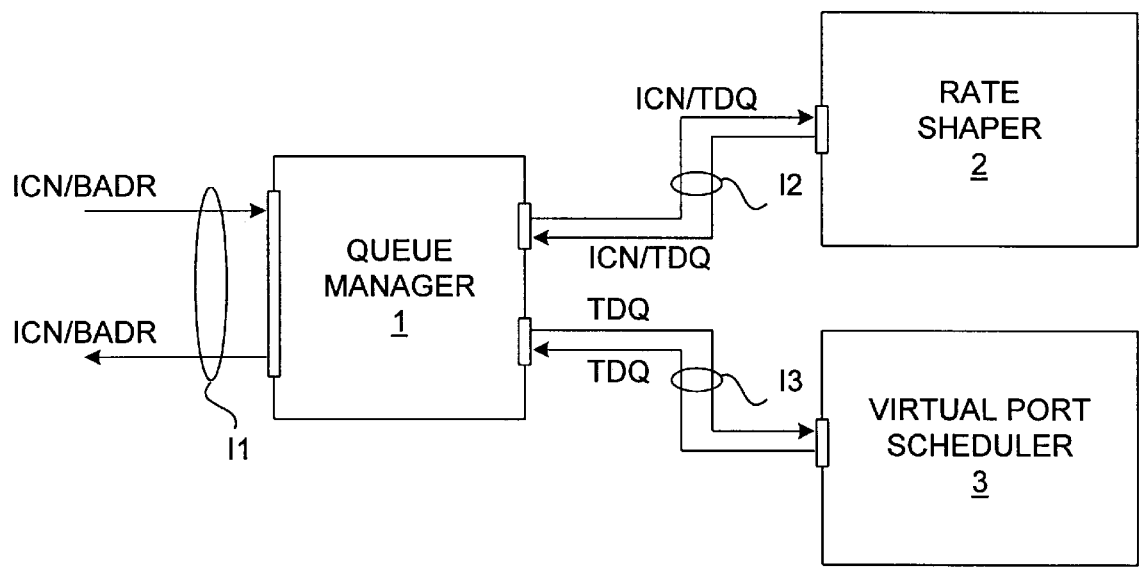
FIG. 1 is a block diagram of a packet scheduler (PS) architecture according to a preferred embodiment of this invention.

FIG. 1 is a block diagram of a packet scheduler (PS) architecture according to a preferred embodiment of this invention, for deployment on a packet switch (switch not shown). In addition to the PS, the packet switch has other parts including interfaces to network links, a buffer memory for buffering packets currently being handled by the switch, one or more computing systems for implementing software control functions for the switch, various application specific integrated circuits (ASICs) for implementing packet-switching functions such as the creation and release of connections, and various control memories for holding data used by the ASICs and/or the computing systems (all these other parts of the switch are not shown in FIG. 1). It is to be noted that the PS makes direct use of a subset of the control memories, as described in further detail below.

The PS is partitioned along service lines such that it comprises three hardware blocks (such as ASICs, for example), namely a queue manager (QM) 1, a rate shaper (RS) 2, and a virtual port scheduler (VPS) 3. The QM 1 implements a basic scheduler service on its own, or can delegate responsibilities to the RS 2 and/or VPS 3 in order to enhance its basic service-set. The RS 2 enhances the overall service-set of the PS by implementing traffic shaping features described later in this specification. The VPS 3 enhances the overall service-set of the PS by implementing virtual port scheduling, also described later in this specification.

Therefore, though the embodiment of the PS shown in FIG. 1 includes the QM 1, RS 2 and the VPS 3, other embodiments are possible depending on which services the PS must provide. More specifically, because the services provided by the RS 2 and the VPS 3 are auxiliary to the services provided by the QM 1 alone, other possible embodiments of the PS include the QM 1 in a stand-alone configuration, the QM 1 connected to the RS 2 alone, or the QM 1 connected to the VPS 3 alone. This partitioning of the PS along service-lines makes the PS of FIG. 1 versatile enough to be deployed in a variety of environments without having to be significantly redesigned.

The PS has a single switch interface I1 for exchanging data with the rest of the switch. The QM 1 has a QM-RS interface I2 to the RS 2, and a QM-VPS interface I3 to the VPS 3. The QM 1 is designed to include the QM-RS interface I2 and the QM-VPS interface I3 notwithstanding the presence or absence of the RS 2 or VPS 3 thereby simplifying the addition of the RS or VPS to a standalone QM.

Regardless of which of the components 1,2,3 are present in the PS, its basic role remains the same. When ingress packets arrive at the switch, they are each associated with a given internal connection number (ICN) by an on-switch translating system that is external to the scheduler. The ICN identifies the connection to which the packet belongs. The packet is also buffered in a packet memory where it remains until it is transmitted from the switch to another node on the network. The role of the PS is to determine when the packet is to be transmitted to that other node.

More specifically, the PS receives the buffer address (BADR) of each ingress packet and the ICN to which the packet belongs, as inputs through interface I1. Later, once the PS has decided the time has come to transmit the packet, it generates a message containing the ICN and the BADR of the packet, which it sends to external systems that use the contents of the message to effect the transmission of the packet.

The QM 1, in particular, becomes involved in the handling of an ingress packet when it is given a BADR/ICN combination for the packet. The QM 1 then stores the buffer address (BADR) of the packet, which is alternatively referred to as a packet-pointer hereinafter, and enqueues a packet-number (PN) associated with the packet-pointer onto a per connection queue (PCQ) that is implemented by the QM 1. Each PCQ holds PNs that are associated with packets that belong to a single ICN.

While the QM 1 is placing PNs on PCQs, the QM 1 is also continually trying to enqueue ICNs whose PCQs have PNs into traffic descriptor queues (TDQs). TDQs are implemented by the QM 1. Each TDQ holds only ICNs whose PCQs have packets to transmit. It is to be noted that an ICN can only be enqueued in certain TDQs. This is because a given TDQ is differentiated from other TDQs according to the speed and frequency with which ICNs are typically dequeued from that TDQ. Since these factors are important determinants of the Quality of Service (QoS) offered to ICNs by the switch, each ICN can only be enqueued in a TDQ that is dequeued with a speed and frequency that supports the QoS requirements associated with the ICN.

It is to be noted that if the RS 2 is connected to the QM 1, the RS 2 helps the QM 1 decide when an ICN can be enqueued on a TDQ.

Once an ICN is enqueued on a TDQ, it remains there until the QM 1 decides to dequeue it. The QM 1 is continually dequeueing ICNs from TDQs. A QM 1 is said to be "serving a TDQ" when it is dequeueing the ICN at the head of the TDQ. It is to be noted that the decision of when to serve a TDQ can be made by the VPS 3 if one is included in the PS, or the QM 1 if no VPS 3 is included in the PS.

When a given ICN is at the head of its given TDQ, and the given TDQ is served, the PN at the head of the given ICN's TDQ is dequeued. This, in turn, results in the QM sending the ICN and the BADR of the dequeued PN to downstream egress nodes which will use this information to transmit the packet referenced by the BADR.

In this manner, the scheduling of the transmission of ingress packets is achieved.

It is to be noted that the decoupling of the QM 1, RS 2, and VPS 3, is facilitated by the simple interfaces that are implemented between the ASICs. The QM-RS interface I2 is used to send a request from the QM 1 to the RS 2 to enqueue a specified ICN onto a specified TDQ by sending an ICN/TDQ identifier pair, and is used to send an ICN/TDQ identifier pair from the RS 2 to the QM 1 thereby granting a previously submitted request to enqueue a specified ICN onto a specified TDQ. In addition, if a request to enqueue is not granted, the RS 2 may grant at a later time through this interface as described in detail later. The QM-VPS interface 13 is used to send a TDQ identifier from the QM 1 to the VPS 3 whenever the eligibility-for-service status of the TDQ changes and for the VPS to send a TDQ identifier to the QM 1 of the next TDQ to be served. By partitioning the PS so that simple interfaces exist between its components, the components are more readily decoupled.

The decoupling of the QM 1, RS 2, and VPS 3 is preferably further facilitated by implementing each as a separate bus component, such as an ASIC, on a generic bus that is used to interconnect all the components of the packet switch. The communication between the bus components may take place across the generic buses according to the methods and apparatus described in a co-pending application entitled "A Message Based Packet Switch Based on a Common Generic Bus Medium for Message Transport", having Ser. No. 09/024,243 filed on Feb. 18, 1998 assigned to the assignee of the present application, and incorporated herein by reference.

Figure 2:
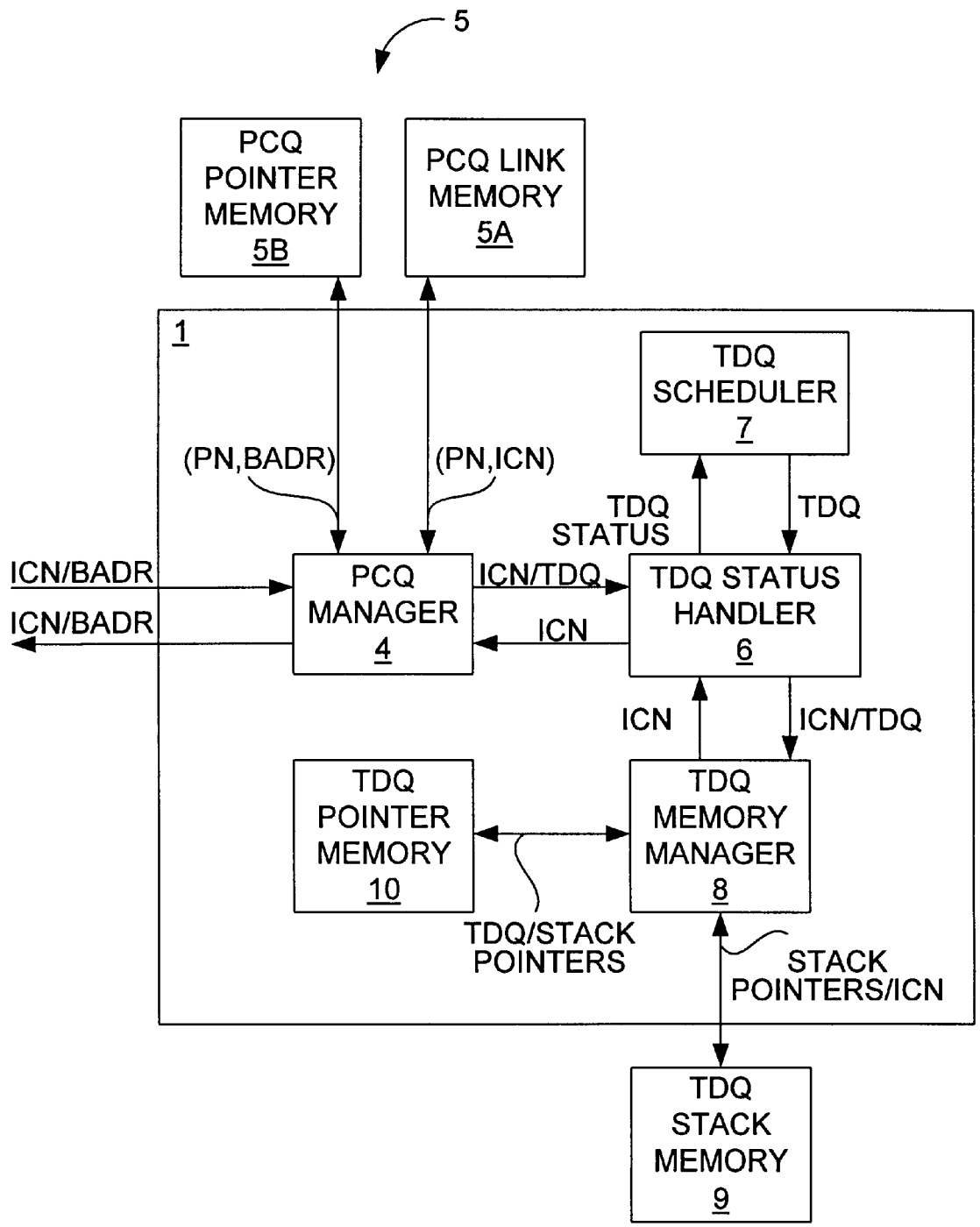
FIG. 2 is a block diagram of a Queue Manager (QM) forming part of the scheduler of FIG. 1.

An embodiment of the invention that comprises the QM 1 alone will now be described in further detail with reference to FIG. 2 and FIG. 3. FIG. 2 is a block diagram of the QM 1. The QM 1 includes a PCQ manager 4 for building and managing PCQs. In a preferred embodiment, PCQs are implemented using linked-lists. The PCQ manager 4 is connected to a PCQ memory 5 that holds the contents of the PCQs. The memory 5 may be part of the previously introduced control memory that serves the whole packet switch, and is divided into two parts—a linked list of PNs that comprise each PCQ are held within a PCQ link memory 5a, while the BADRs associated with each of the PNs are held in a PCQ pointer memory 5b. The PCQ manager 4 passes PNs to the PCQ pointer memory 5b in order to obtain the BADRs of the referenced packets. The PCQ manager 4 passes PN/ICN combinations to the PCQ link memory 5a in order to enqueue or dequeue PNs to or from ICNs.

The PCQ manager 4 is also connected to a TDQ status handler 6 that keeps track of which ICNs are queued for service on each of the TDQs implemented by the QM 1. The PCQ manager 4 submits to the TDQ status handler 6 an ICN to enqueue along with a given TDQ on which to enqueue the ICN. The TDQ status handler 6 returns a previously submitted ICN to the PCQ manager 4 once it has been dequeued from its respective TDQ.

The TDQ status handler 6 is connected to a TDQ scheduler 7 that decides which TDQs will be served and at what times. The TDQ status handler 6 passes TDQ numbers and the service-eligibility status of the corresponding TDQs to the TDQ scheduler 7. The TDQ scheduler 7 passes TDQ numbers that each correspond to TDQs that are to be presently served.

The TDQ status handler 6 is also connected to a TDQ memory manager 8 which builds and manages the TDQs. In a preferred embodiment, stacks are used to implement TDQs because they are ideal for implementing a round-robin service algorithm that is described below and used by the TDQ scheduler 7. One stack is implemented for each TDQ, and each stack entry contains an ICN. The TDQ status handler 6 passes ICN/TDQ combinations in order to push or pop ICNs to or from TDQs.

The stacks of ICNs are held in a TDQ stack memory 9 that may be part of the larger control memory that serves the whole packet switch. Pointers to the stacks, hereinafter stack-pointers, are held in a TDQ pointer memory 10. The TDQ memory manager 8 obtains pointers to the stack of each TDQ from the TDQ pointer memory 10. The TDQ memory manager 8 uses the pointers it obtains from the TDQ pointer memory 10 to push ICNs onto or pop ICNs from TDQ stacks.

Figure 3:
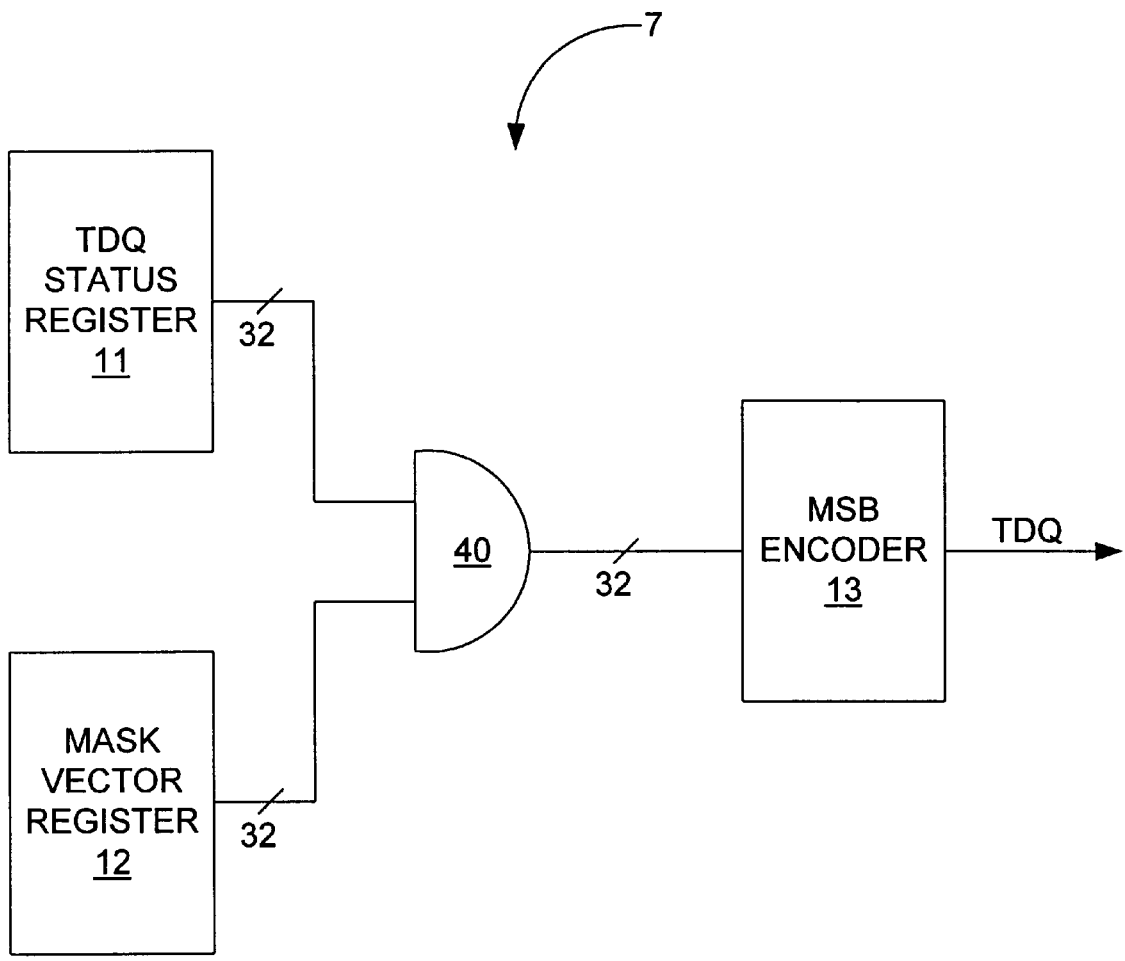
FIG. 3 is a block diagram of a traffic descriptor queue (TDQ) scheduler that forms part of the QM of FIG. 2.

FIG. 3 is a block diagram of the traffic descriptor queue (TDQ) scheduler 7 introduced in FIG. 2. The TDQ scheduler makes use of an N-bit wide status register 11 and an N-bit wide mask vector register 12, N being the number of TDQs implemented on the PS. In this description, N is assumed to be equal to 32. The outputs of the registers 11,12 feed into the inputs of an AND gate 40, whose output feeds into a Most Significant Bit (MSB) encoder 13.

The status of all 32 TDQs are recorded in the TDQ status register 11. Each bit-entry of the register corresponds to the status of a single TDQ. The value of each bit-entry indicates whether or not the associated TDQ is eligible for service, eligibility being achieved by a TDQ when it has ICNs that need to be dequeued. A 1-bit in an entry corresponding to a given TDQ means the given TDQ is presently eligible for service, and a 0-bit means otherwise.

The 32 bits in the mask vector register 12 are sequentially set to one, with only a single bit being set to one at any given instant in time. It is to be noted that the operational speed with which the value in the mask vector register 12 changes, is related to the time required to serve a TDQ.

Scheduling is effected by logically bitwise ANDing the TDQ status register 11 values with the mask vector register 12 values at the AND gate 40. Since the value from the mask vector register 12 only has a single 1-bit at any given time, the 32-bit value that emerges from the AND gate 40, at most, a single 1-bit. The value that is fed into the MSB encoder 13 yields the number of a TDQ that is both eligible for service, as determined by the value of the TDQ status register 11, and that presently has an opportunity to receive service, as determined by the present value of the mask vector register 12. If, for example, the 25th position on the status register 11 and the mask vector register 12 both contained 1-bits, the MSB encoder would be fed a binary value with a 1-bit at the 25th position, which the encoder would translate into the number 25. This would result in TDQ 25 being served. If TDQ 25 is not eligible for service at the time the 25th bit of the mask vector register 12 is set high, no service results.

The effect of the above-described scheduling operation is to provide a round-robin scheduling service to eligible TDQs, the eligibility of each TDQ being indicated by the value of its corresponding bit entry in the status register 11.

The above described method uses a mask vector which has a single bit set at any time, with all possible bits being set in sequence. Other masking strategies are possible, for example ones in which several bits are set for each mask vector state. In this case, if the result of the ANDing of the mask vector register with the TDQ status register has more than a single 1-bit, the MSB encoder 13 selects the first 1-bit (the most significant bit) it sees.

Figure 4:
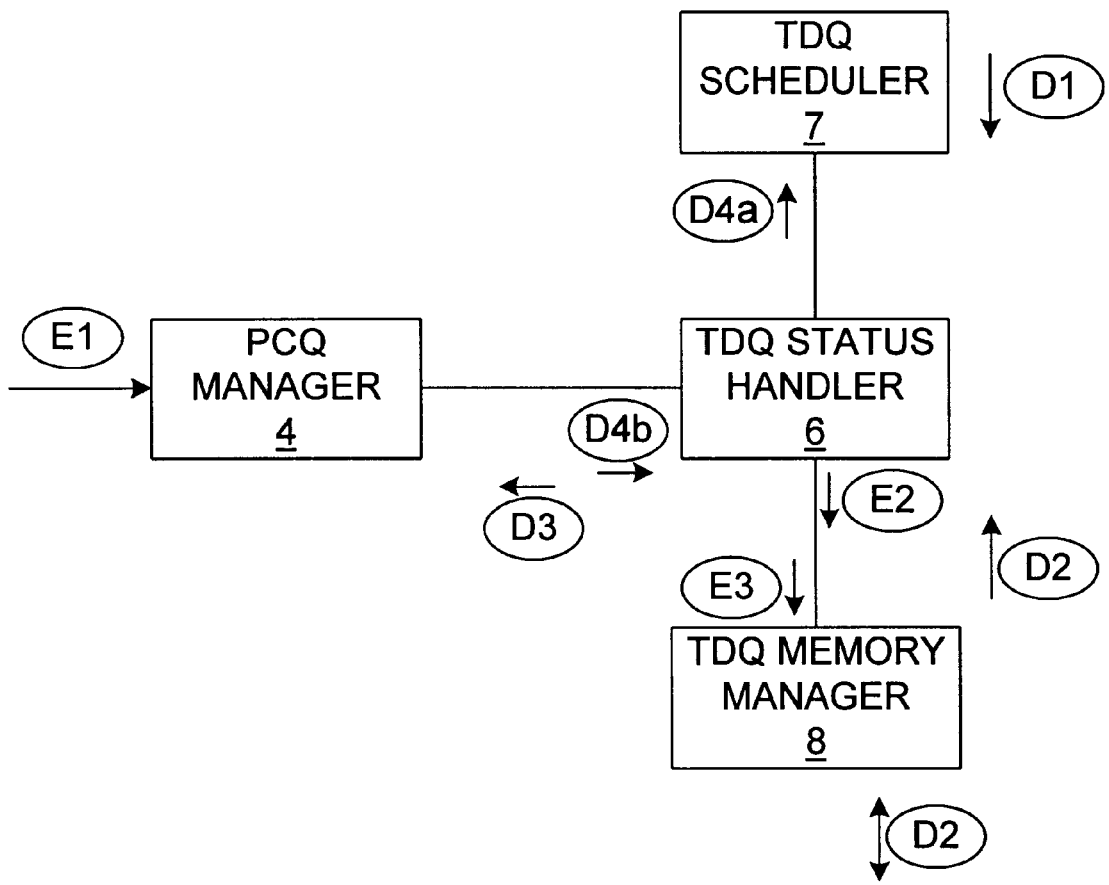
FIG. 4 is a block diagram that illustrates the flow of control information relating to packets through the components shown in FIG. 2.

FIG. 4 is a block diagram that illustrates the flow of control information relating to packets through the QM 1. FIG. 4 shows only the PCQ manager 4, the TDQ scheduler 7, the TDQ status handler 6 and the TDQ memory manager 8, as well as alphanumeric call-outs that indicate stages of the above-mentioned sequences that are described below. Alphanumeric call-outs prefixed with an "E" relate to enqueueing operations, while those prefixed with a "D" relate to dequeueing operations.

The enqueue sequence starts at stage E1 when an ICN/BADR combination corresponding to an ingress packet is received by the PCQ manager 4. The PCQ manager 4 places the BADR into the PCQ pointer memory 5b (not shown) and enqueues a corresponding PN representing the ingress packet into the PCQ associated with the inputted ICN. The contents of the PCQ are held in the PCQ link memory 5*a* (not shown). The PCQ manager 4 then determines which TDQ is associated with the inputted ICN, and passes that TDQ and the ICN to the TDQ status handler 6.

At stage E2, the TDQ status handler 6 queries the TDQ memory manager 8 to see if another copy of the ICN is already enqueued in its associated TDQ. This condition would be true if the transmission of a previously received ingress packet belonging to the same ICN had yet to be scheduled. If another copy of the ICN is already enqueued in its associated TDQ, then the enqueueing of an ICN in order to initiate the transmission of any subsequently received ingress packets is postponed. (Multiple copies of a single ICN are not permitted on a TDQ. This is done to prevent bursts of traffic belonging to one ICN from disrupting the scheduling algorithm implemented by the TDQ scheduler 7). The current enqueue sequence would come to an end. Another attempt is made to enqueue the ICN in order to initiate the transmission of the above-referred to ingress packet when said other copy of the ICN is dequeued from the TDQ, in a process referred to as re-enqueueing that is part of the dequeue process described below.

If another copy of the inputted ICN is not in the associated TDQ at stage E2, then at stage E3, the TDQ memory manager 8 is instructed by the TDQ status handler 6 to enqueue the associated ICN into the associated TDQ. This activity ends the enqueueing sequence.

The sequence of dequeueing operations that occurs when a packet transmission is initiated is also illustrated in FIG. 4. Some time may pass between the end of the enqueue sequence and the start of the dequeue sequence, depending on the service algorithm being implemented by the TDQ scheduler 7. The dequeue sequence begins at stage D1 when the TDQ scheduler 7 selects a TDQ that is eligible for service using the circuit illustrated in FIG. 3. The selected TDQ is the one whose entry is set to a 1-bit in both the status register 11 and the mask vector register 12 of FIG. 3. The selected TDQ is passed to the TDQ status handler 6 which passes it to the TDQ memory manager 8. At stage D2, the ICN at the top of the selected TDQ is dequeued from the TDQ stack memory 9 (not shown in FIG. 4) by the TDQ memory manager 8 and passed to the TDQ status handler 6. At stage D3, the PCQ manager 4 is instructed to dequeue a PN belonging to the ICN that was just dequeued by the TDQ memory manager 8. The PN is used to obtain the address of a packet (BADR) that is in the buffer memory of the switch. The BADR and ICN are then output by the PCQ manager 4 to the remainder of the switch. For the case that the PS is connected to a common bus along with other switch components, the BADR is packaged along with the ICN that was just dequeued at stage D2, into a message called a QMS egress packet cell information block (CIB). The QMS egress CIB is sent from the PS to upstream bus elements along the egress path. The generation of the QM egress CIB will result in the transmission of the packet referenced by the enclosed BADR.

Also, at stage D3, the PCQ manager 4 determines whether or not the ICN dequeued at stage D2 has more PNs to dequeue. This would be true if previous attempts to enqueue an ICN into a TDQ at step E2 had resulted in the enqueue process ending because of a previous copy of the same ICN already being enqueued on the TDQ. This information can be used by the QM 1 to decide whether or not to re-enqueue the ICN into its TDQ.

If the ICN has no further PNs to dequeue, the ICN is not re-enqueued into the selected TDQ. The dequeue sequence then ends at stage D4*a*, when the TDQ status handler 4 checks to see if any ICNs are enqueued on the selected TDQ, and sets the bit in the status register 11 corresponding to the selected TDQ to a 0-bit if no further ICNs are enqueued.

If at stage D3, it is determined that the ICN dequeued at stage D2 has further PNs to dequeue, a request is made to re-enqueue the ICN onto its TDQ at stage D4*b*. The request is made when the PCQ manager 4 passes the ICN/TDQ combination back to the TDQ status handler 6. The request appears to the TDQ status handler 7 just like a request that was generated at the end of step E2 of the enqueue sequence. The only difference is that the request in the re-enqueue case does not relate to an ingress packet that has just arrived on the switch, but rather to an ingress packet that had arrived previously but whose transmission could not be immediately scheduled. Therefore, the re-enqueue request is processed just like an enqueue request according to steps E3 and E4 as described above.

The above-described embodiment implements a basic PS feature-set. In another preferred embodiment that is presently described, traffic shaping features can be implemented by adding the RS 2 to the QM 1. The RS 2 implements traffic shaping by optionally delaying when each ICN is enqueued on its respective TDQ. More specifically, the RS 2 receives requests from the QM 1 to enqueue a given ICN onto its associated TDQ, decides a time at which the ICN can be enqueued on the TDQ, and then affirmatively responds to the QM's request at that time, thus allowing the QM to continue with the enqueue procedure. The RS 2 achieves traffic shaping by timing its generation of affirmative responses in accordance with various QoS constraints that are associated with each ICN. Permissions to enqueue ICNs whose packet transmission rates are to be throttled back in accordance with a shaping algorithm, for example, are not rapidly generated by the RS 1. In contrast, the RS 2 rapidly generates and communicates permissions for enqueue ICNs that are provisioned to support fast packet transmission rates.

The RS 2 determines a time at which to allow ICNs to be enqueued on their associated TDQs using a credit-based algorithm, in which a credit-count is maintained for each ICN being supported by the PS, and in which decisions of when to enqueue ICNs onto TDQs are based on the outcome of comparisons of the credit-counts to predetermined credit-count thresholds. Typically, the RS 2 does not allow an ICN to be enqueued onto its associated TDQ until the credit count of the ICN exceeds its predetermined credit-count threshold.

Figure 5:
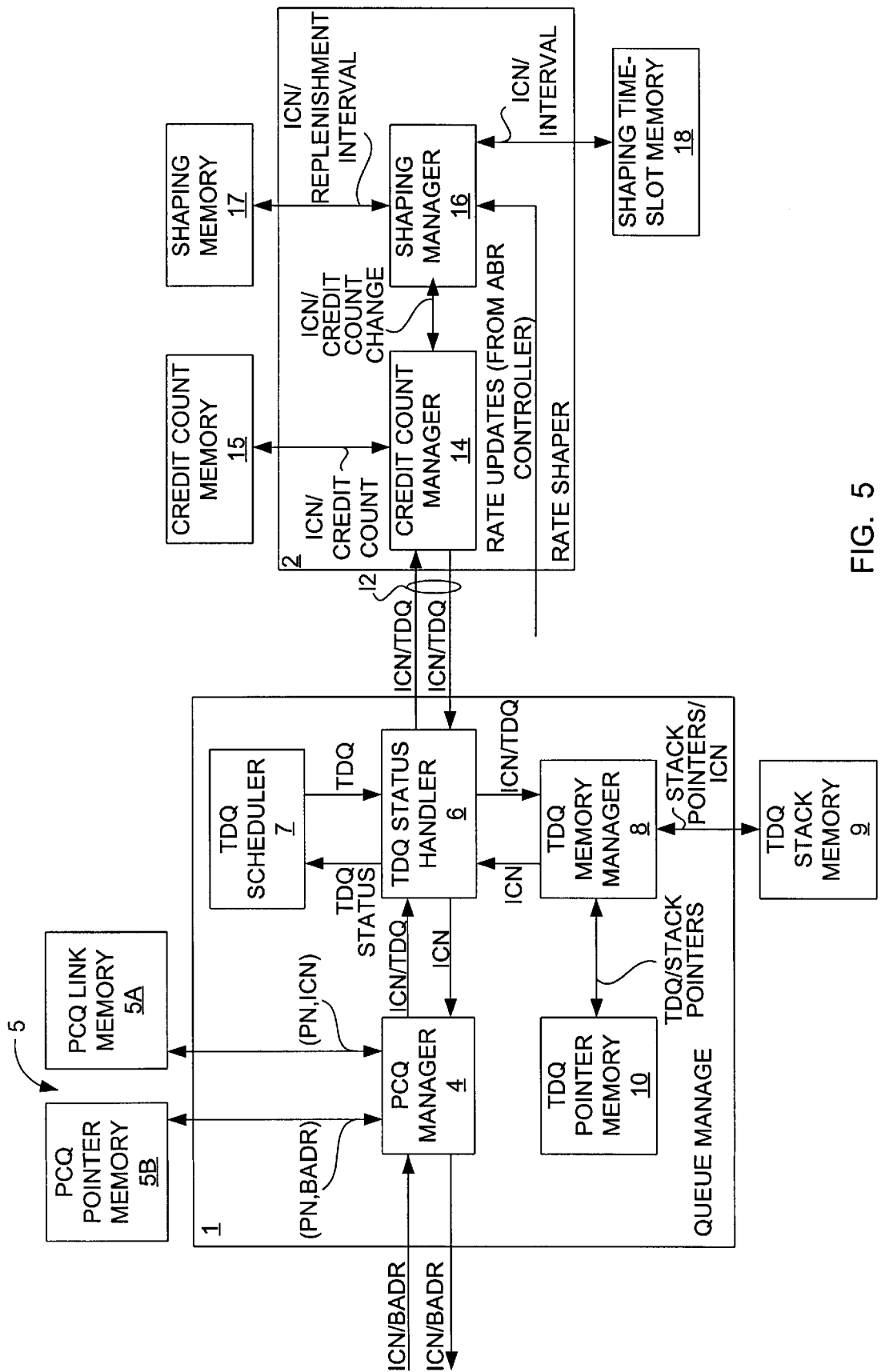
FIG. 5 is a block diagram of an embodiment of the PS that includes the QM and a Rate Shaper (RS)

FIG. 5 is a block diagram of a PS that supports traffic shaping, and thus has an RS 2 and QM 1. The components of the QM 1 are the same as those described previously with respect to FIG. 2. The RS 2 includes an ICN credit-count manager 14 that maintains the credit-counts for each ICN, and that decides based on an analysis of its credit counts when to instruct the QM 1 to enqueue ICNs into their associated TDQs. The ICN credit-count manager 14 implements the interface with the QM 1, receiving requests to enqueue specified ICNs onto specified TDQs, and sending back permissions to enqueue specified ICNs onto specified TDQs. The ICN credit-count manager 14 also decreases the credit-counts of an ICN whenever the QM 1 is given permission to enqueue the ICN on its associated TDQ.

The ICN credit-count manager 14 is connected to an ICN credit count memory 15, which may be part of the control memory of the packet switch, and which stores the present credit-counts for each ICN. The ICN credit count manager 14 passes messages to the ICN credit count memory 15 inquiring about the credit-counts and credit-count thresholds of given ICNs, and adjusting credit counts upwards or downwards. The ICN credit count memory 15 returns credit-counts and credit-count thresholds to the ICN credit count manager 14.

The ICN credit count manager 14 is also connected to a shaping manager 16, which is responsible for periodically replenishing the credit-counts of each ICN. Every time the shaping manager 16 replenishes the credit-count, it communicates the ICN and the size of the replenishment back to the ICN credit-count manager. The shaping manager 16 determines how often and by how much to replenish each ICN's credit-count using information that is held in a connection shaping memory 17. This information comprises the credits to be granted to each ICN per replenishment-interval, and the desired length of each replenishment-interval. The size of the replenishment and the preferred length of the replenishing period are both predetermined values that are sent back to then the shaping manager 16 whenever it sends the ICN.

The shaping manager 16 is also connected to a shaping time-slot memory 18, which may be part of the switch's control memory, and which stores data structures used to calculate the actual replenishment intervals using a method described below. The shaping manager 16 sends an ICN paired with a desired replenishment interval for that ICN to the shaping time-slot memory 18. The shaping time-slot memory 18 returns an ICN to the shaping manager whenever it is time to replenish the credit-count of that ICN.

It is to be noted that the shaping manager 16 can also optionally receive, from an Available Bit Rate (ABR) controller (not shown), rate-updates for ICNs that identify ABR connections. The ABR controller used in a preferred embodiment is described in a co-pending application entitled "An architecture for ABR processing within an ATM switch", filed on the same date as the present application, assigned to the assignee of the present application, and incorporated herein by reference. In other embodiments, a conventional ABR controller can provide the required rate-updates. The rate-updates from the ABR controller are used to determine the size of the replenishments for ICNs that support the ABR service.

Figure 6:
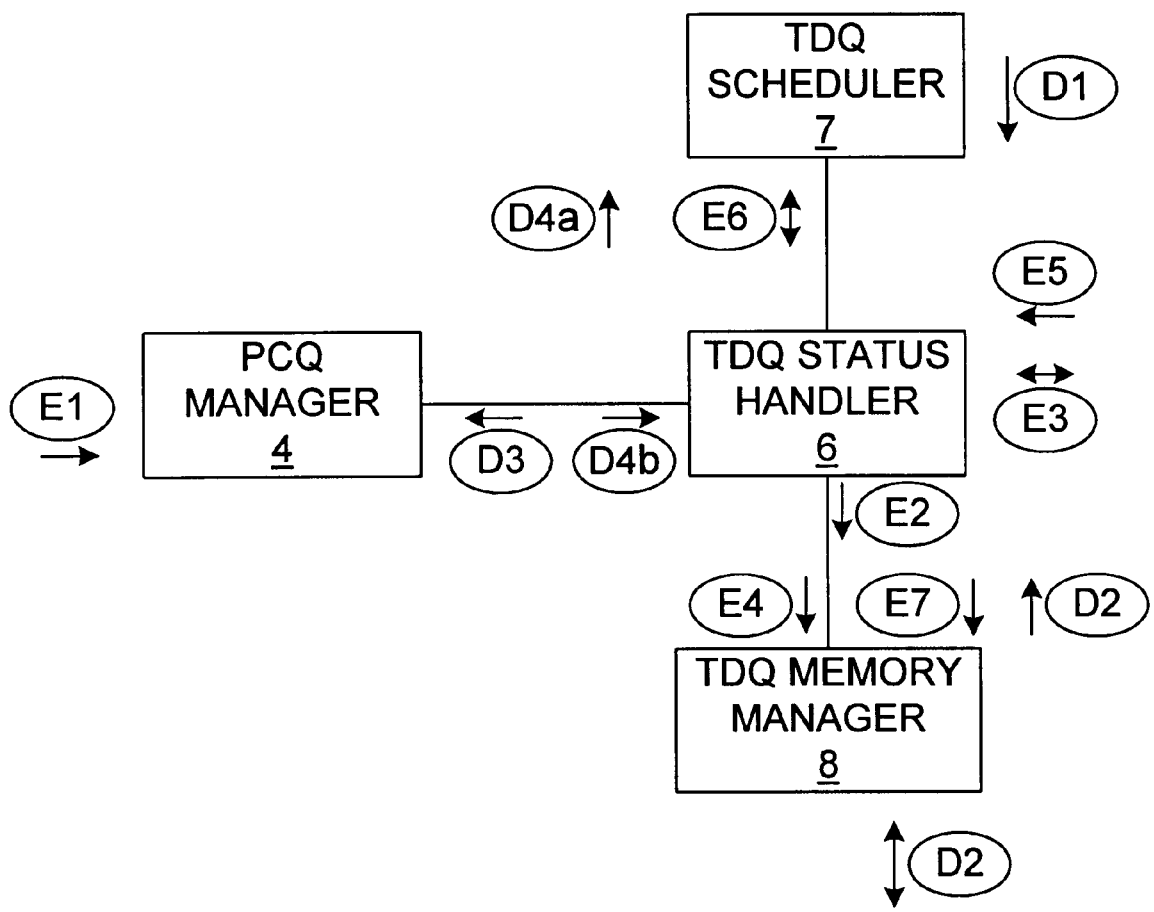
FIG. 6 is a block diagram that illustrates the flow of control information relating to packets through the components shown in FIG. 2 when the QM is operated in conjunction with the RS.

Generally, the QM 1 and RS 2 decide whether or not to enqueue an ICN onto its associated TDQ, according to the current service-eligibility status of the associated ICN within the TDQ, and the number of credits the ICN owns. FIG. 6 is a block diagram that more specifically illustrates the sequences of enqueueing and dequeueing operations that occur in this embodiment. FIG. 6 shows only the PCQ manager 4, the TDQ scheduler 7, the TDQ status handler 6 and the TDQ memory manager 8, as well as alphanumeric call-outs that indicate stages of the above-mentioned sequences that are described below.

The first two stages of this embodiment, stages E1 and E2, are identical the first two stages of the enqueue sequence illustrated in FIG. 4 (also referred to as E1 and E2).

After stage E2 is completed, if the TDQ scheduler 6 finds out from the TDQ memory manager that the associated ICN is not already enqueued in a TDQ, the TDQ scheduler 6 will ask the RS 2 to determine if the number of credits held by the ICN exceeds the predefined threshold for that ICN. This is done at stage E3. The QM 1 does not enqueue that ICN into its TDQ until the RS 2 indicates that the credit-count of the ICN has exceeded its threshold. In a preferred implementation, the thresholds are zero in which case any non-zero amount of credit is sufficient for enqueueing to proceed. If there is insufficient credit, the enqueueing sequence ends. If there is sufficient credit, then at stage E4, the TDQ memory manager 8 is instructed by the TDQ status handler 6 to enqueue the associated ICN into the associated TDQ. This activity ends the enqueueing sequence.

In addition to enqueueing in response to enqueue requests, the RS 2 also may autonomously determine that it is time to enqueue an ICN. It does this by reporting to the QM 1 that the ICN's credit-count exceeds its predetermined credit threshold (stage E5). When this happens, the TDQ status handler 4 ensures that the status register 11 indicates the associated TDQ currently has ICNs to dequeue and is thus eligible for service at stage E6. At stage E7, the TDQ memory manager 8 is instructed to enqueue the ICN into its TDQ by the TDQ status encoder 16. The enqueue sequence ends when the ICN is enqueued into its TDQ.

FIG. 6 also illustrates the dequeue sequence that occurs when the PS comprises a QM 1 and an RS 2. The dequeue sequence is identical to the dequeue sequence illustrated in FIG. 4.

While the QM 1 is allowing or restricting the enqueueing of ICNs into TDQs using credit assessments performed and provided by the RS 2, the RS 2 is also continually decreasing and replenishing the credit-counts of the ICNs according to the terms of predetermined traffic contracts that each define the QoS features that must be supported by an ICN. Credit-count decreasing and replenishing occurs using the apparatus of FIG. 7, which is described below.

Figure 7:
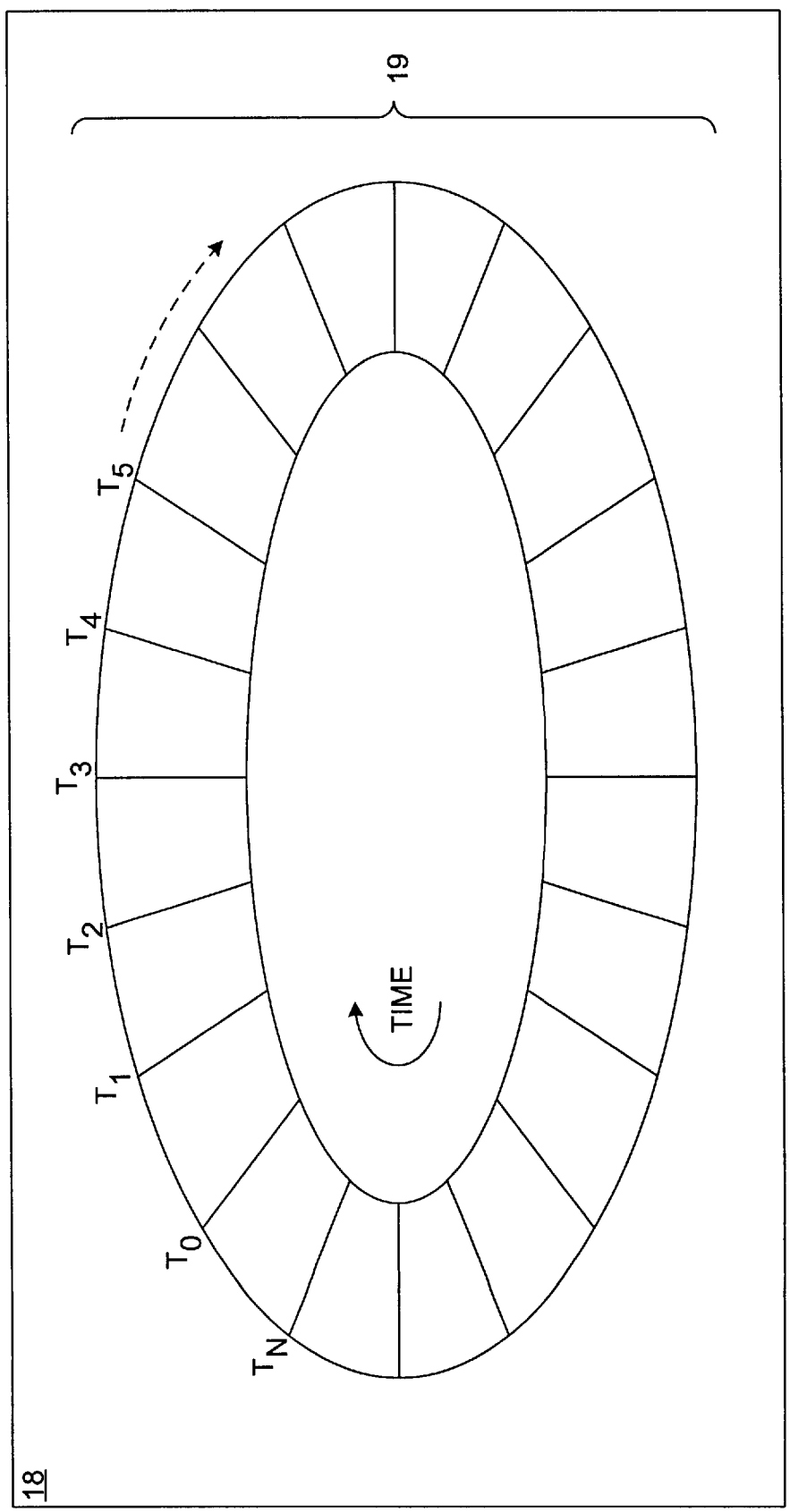
FIG. 7 is a conceptual illustration of a shaping-time slot memory that forms part of the RS of FIG. 5.

FIG. 7 is a conceptual illustration of the shaping-time slot memory 18, which can be described as a time-space map called a time-wheel 19. The time-wheel 19 comprises time-slots, that are filled with ICNs. The position of each slot within the wheel 19 corresponds to a time at which the ICN in the time-slot will receive a new credit.

In a preferred embodiment, the apparatus of FIG. 5 and FIG. 7 decreases and replenishes credit-counts according to the following method. The credit-count of a given ICN is decreased by a predetermined amount by the ICN credit-count manager 14 every time it passes the given ICN back to the QM 1. While the credit-counts are being periodically decreased by the ICN credit-count manager 14, the same credit-counts are concurrently being replenished as the shaping manager 16 progressively reads the ICN entries of each time-slot in the time-wheel 19. More specifically, the replenishment of the credit-count of a given ICN is effected every time the shaping manager 16 reads the given ICN from the time-wheel 19. When this happens, the shaping manager 16 queries the shaping memory 17 to get the number of credits to supply per replenishment for that ICN, and increases the given ICN's credit-count by the number obtained from the shaping memory 17.

After replenishing the credit-count of a given ICN, the shaping manager 16 also schedules a future time at which the next replenishment can take place. The shaping manager 16 does this by obtaining, from the shaping memory 17 a desired replenishment interval for the given ICN. It then uses the desired interval to select a time-slot in the wheel 19 in which to place the next entry for the given ICN. If the shaping memory 17 indicates that the given ICN has a desired replenishment-interval of eight time-slots for example, then the shaping manager 16 will write the given ICN into a time-slot that is eight slots ahead of the last slot it occupied. If the shaping manager 16 wishes to place an ICN into a given time-slot that is already occupied by some other ICN, it creates a linked-list of ICN entries at the given slot. When the shaping manager 16 arrives at the given time-slot to read entries and thus effect credit replenishments, all the ICNs in the linked-list are read-in before the manager 16 reads the ICNs in the next time-slot. In this way, each ICN is given a replenishment interval that roughly approximates its pre-specified desired replenishment interval.

Every time the credit-count of an ICN is replenished by the shaping manager 16, the amount of the replenishment count is sent back to the ICN credit count manager 14, which updates the appropriate credit-count entry in the ICN credit count memory 15.

The embodiment that includes both the QM 1 and the VPS 3, which as mentioned before is used to implement support for virtual port scheduling, will now be described. Virtual port scheduling is based on the concept of a virtual port. When a single physical interface is logically subdivided into channels of specific bandwidth, each of these channels may be referred to as a VP (virtual port). A virtual port may, for example, be a port that:

1) terminates a link that starts at a customer premises equipment (CPE) site;
2) is implemented along with other virtual ports on a platform such as a PON (Passive Optical Node); and
3) has the traffic flowing through it scheduled by a remote packet switch connected to the port across a network link.

Virtual port scheduling is the service provided when a switch schedules traffic for remotely located ports on a remote network element. Such a remote network element may not schedule traffic for its own ports because it is typically located in the outside plant, meaning that it is costly to maintain and provision if it has to implement sophisticated packet switching features such as intelligent buffer management. As a result, typically such a remote network element is forced to use simple fixed-size buffers in the place of a scheduler. This in turn leads to the remote network element having to rely on the scheduler of a connected packet switch to implement some form of flow control over the traffic flowing through the virtual ports. It is this remote scheduler that is contemplated when the term "virtual port scheduler" is used.

The PS provides a VP scheduling service for VPs by modelling each supported VP as a type of TDQ, and by implementing a more sophisticated version of the TDQ scheduler to determine when the TDQs are to be served. Modelling virtual ports as TDQs is feasible because different virtual ports, like different instances of other types of TDQs, each serve sets of ICNs that require similar QoS features. Scheduling service for virtual ports, as opposed to other types of TDQs, requires a more sophisticated approach because the downstream network elements cannot perform their own intelligent buffering in order to prevent overflows when the amount of traffic they receive greatly exceeds the amount of traffic they can send to connected CPE sites. This lack of functionality on the downstream network elements can be addressed if the virtual port scheduler on an upstream node is adapted to closely monitor the rates at which traffic is flowing to each virtual port, so as to downwardly adjust the traffic rates when overflows in the network element buffers seem imminent. A TDQ scheduler adapted to closely monitor and adjust rates of traffic so as to prevent overflows of fixed-size downstream network element buffers, can thus serve as a virtual port scheduler. The VPS 3 is such an adapted TDQ scheduler, that when connected bypasses the TDQ scheduler 7.

Like the TDQ scheduler 7, the VPS 3 receives as input updates indicating which TDQs are eligible/ineligible for service from the TDQ status handler 4, and concurrently generates as output a series of TDQs that are to be served. Unlike the TDQ scheduler 7, the VPS 3 does not decide which TDQ is to receive an opportunity for service by ANDing the contents of the single mask vector 12 with the contents of the status register 11, as illustrated by FIG. 3. Such a method may cause overflows on the buffers of downstream network element buffers.

Instead, the VPS 3 decides which TDQ is to receive an opportunity for service using a more complicated algorithm that enforces flow control on the traffic heading toward each virtual port, so as to avoid overflowing the fixed size buffers of the downstream network elements, and so as to provide each of the CPE sites connected to the virtual ports with adequate flows of traffic. The VPS 3 enforces flow control by monitoring the service rates of each of the supported TDQs and by adjusting them to conform to certain predetermined QoS parameters, the parameters being predetermined so as to prevent overflows in downstream network element buffers and so as to provide adequate flows of traffic to downstream CPE sites.

More specifically, the VPS 3 ensures that the traffic flow heading through each TDQ conforms with a predetermined traffic contract. The traffic contracts are defined such that, if followed, overflows in downstream network element buffers are avoided, and adequate flows of traffic to downstream CPE sites are provided. In a preferred embodiment, the traffic contract attaching to each TDQ specifies the following controls:

1) for each TDQ, the service rate is maintained to be greater than a minimum packet rate (MPR);
2) for each TDQ, the service rate is maintained to be less than a peak packet rate (PPR);
3) the service rate for all TDQs are set so that different TDQs could obtain different predetermined percentages of the link, also referred to as fair shares, once the MPRs and PPRs of all TDQs had been deemed not to have been breached; and
4) the service rates for all TDQs are set to implement a work-sharing function, such that a busy TDQ gets more of the link if other TDQs are not so busy, once the three above mentioned criteria have been satisfied.

Figure 8:
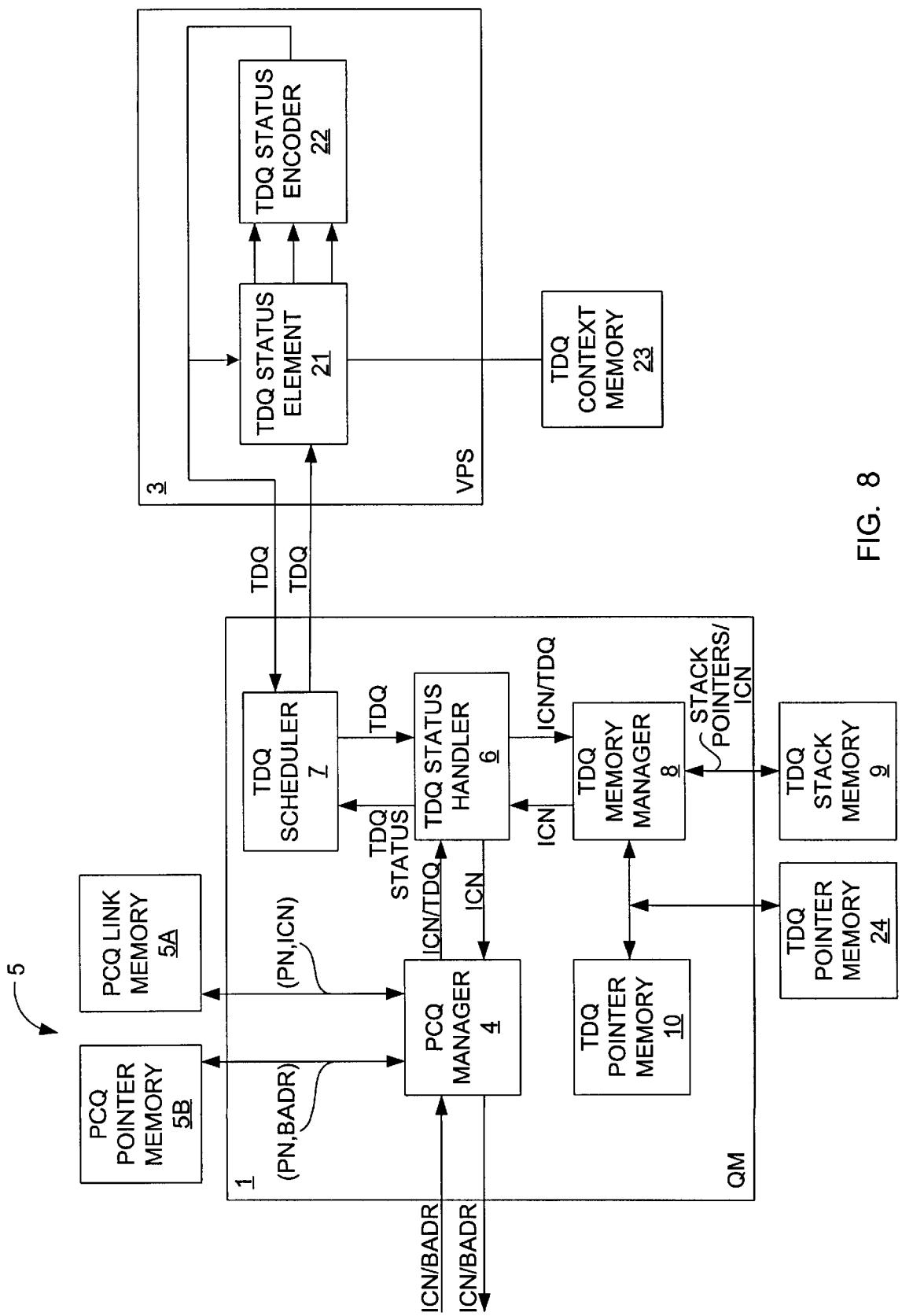
FIG. 8 is a block diagram of an embodiment of the PS that includes the QM and the VPS.

FIG. 8 is a block diagram of the VPS 3, and its interfaces with the QM 1, according to a preferred embodiment. The VPS 3 of FIG. 8 comprises a TDQ status element 21 and a TDQ status encoder 22. The TDQ status element 21 is also connected to a TDQ context memory 23, which may be part of the switch's control memory and which hold the current service rates, MPRs, PPRs, and fair share values for each supported TDQ. The TDQ status element 21 sends bit vectors that are described below with reference to FIG. 9, to the TDQ status encoder 22.

The output of the TDQ status encoder 22 is the output of the entire VPS 3, which is a TDQ that is to be presently served. This output feeds into the TDQ status element 21 for feedback purposes that are described below, as well as into the QM 1 for scheduling purposes.

It is to be noted that the TDQ scheduler 7 and the TDQ pointer memory 10 of the QM 1 are bypassed when the QM 1 makes use of the VPS 3. The functionality of TDQ scheduler 7 is executed by the VPS 3. The functionality of the TDQ pointer memory 10 is replaced by that of a second larger TDQ pointer memory 24.

Figure 9:
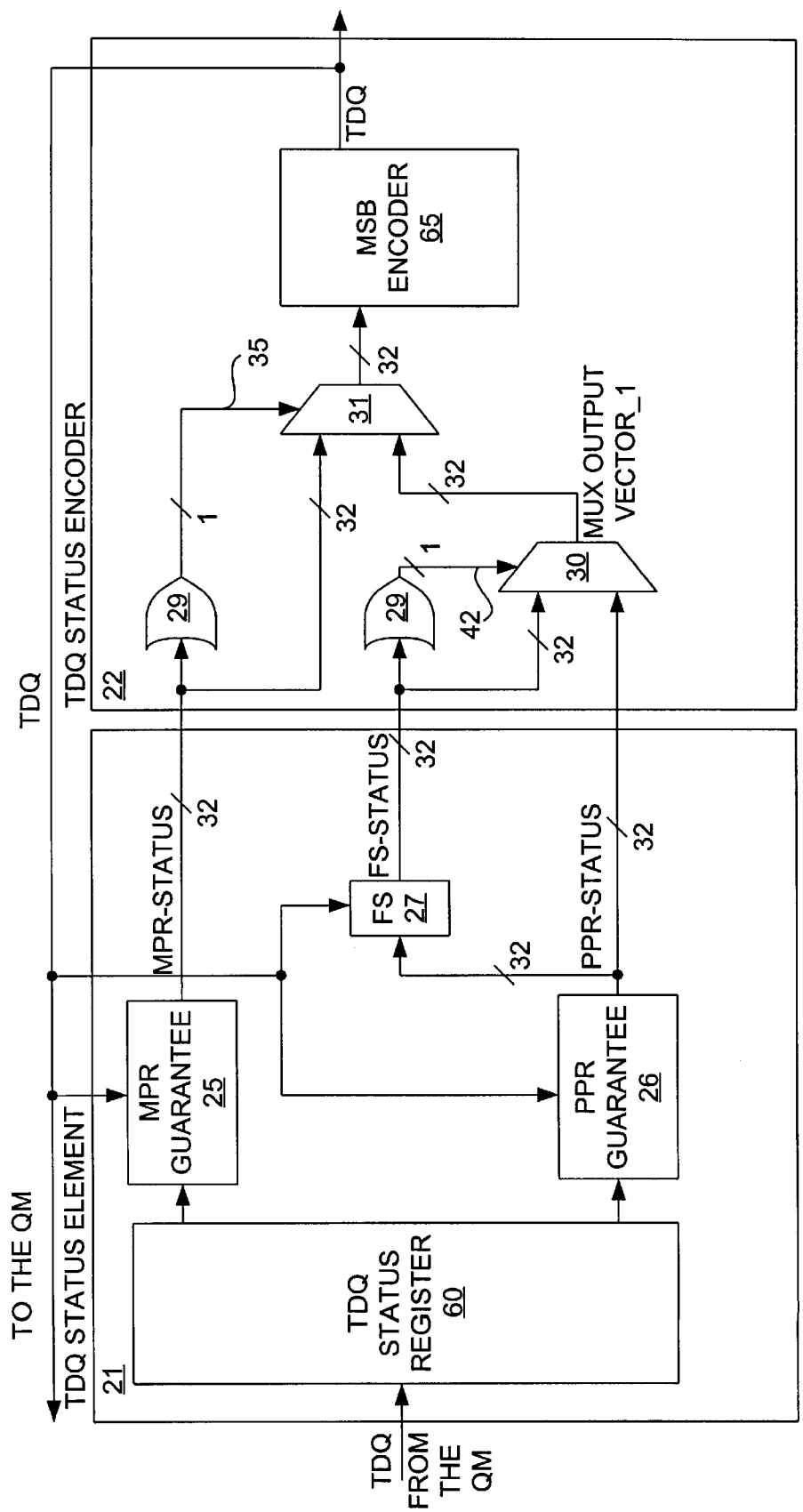
FIG. 9 is a circuit diagram of a TDQ status element and a TDQ status encoder forming part of the VPS of FIG. 8.

FIG. 9 is a detailed block diagram of the VPS 3. Connections to the context memory 23 are not shown in FIG. 9. The TDQ status element 21 contains a status register 60, which like the status register 11 described with reference to FIG. 3, indicates which TDQs have ICNs to dequeue and are therefore eligible for service. The status register 60 outputs an M-bit TDQ-status vector, M being the number of TDQs being supported by the PS (M is assumed to be 32 for the purposes of this description). A 1-bit in the TDQ-status vector corresponding to a given TDQ means the given TDQ is presently eligible for service, and a 0-bit means otherwise. The TDQ-status vector is sent to an MPR guarantee block 25 that outputs an M-bit MPR-status vector. Each bit-entry of the outputted MPR-status vector corresponds to a single TDQ. Entries with 1-bits denote service-eligible TDQs that are being served at rates less than their respective MPRs. Entries with 0-bits denote TDQs that are being served at rates exceeding their respective MPRs. The MPR-status vector is sent to the TDQ status encoder 22.

The TDQ-status vector is also sent from the status register 60 to a PPR guarantee block 26, which outputs an M-bit PPR-status vector. The PPR guarantee block 26 adjusts the PPR-status vector so that service-eligible TDQs with a service rate less than their respective PPRs have their corresponding bit-entries set high. All other bit-entries are set low. It is to be noted that an Nth bit entry in any of the three aforementioned status vectors, the TDQ, MPR and PPR-status vectors, correspond to the same TDQ. The PPR-status vector output of the PPR block 26 sent to the TDQ status encoder 22 and also to a fair-share block (FS) 27.

The FS block 27 receives the PPR-status vector and outputs an M-bit FS-status vector. Entries that are set high represent service-eligible TDQs that are not being served at rates that exceed their respective PPRs and that are also not receiving their respective predetermined percentage, hereinafter fair shares, of the link connecting the switch to the remote network element. Entries that are set low represent TDQs that either are receiving service rates that exceed their respective PPRs, or receiving shares of the link exceeding their respective fair shares. The FS-status vector is sent to the TDQ status encoder 22.

The TDQ status encoder 22 contains the MSB encoder 65 plus various logic blocks, namely an OR gate 28, a second OR gate 29, a 2-to-1 multiplexer (MUX) 30 and a second 2-to-1 MUX 31. The MUX 30 has a control input 42 whose value determines which of the PPR-status vector or the FS-status vector to pass through as a MUX output vector_1. When control input 42 is driven high, the FS-status vector is passed through the MUX 30, otherwise the PPR-status vector is passed through the MUX 30. Similarly, the MUX 31 has a control input 35 whose value determines which of the MUX output vector_1 or MPR-status vector to pass through as MUX output vector_2. When the control input 35 is driven high, the MPR-status vector is passed through the MUX 31, otherwise the MUX output vector_1 is passed through the MUX 31.

The OR gate 28 receives the MPR-status vector as input, performs a logical OR function between all of the bits in the MPR-status vector, yielding a 1 bit as output when at least one of the 32 bits of the MPR-status vector is a one, and passes its output to the control input 35 of the MUX 31. Similarly, MUX 30 receives the output of the OR gate 29 as its control input 42. The output of the MUX 31, MUX output vector_2, is connected to a sole input of the MSB encoder 65. The output of the MSB encoder 65 is fed back to the MPR guarantee block 25, the PPR guarantee block 26 and the FS block 27.

The apparatus illustrated in FIG. 9 implements the following method. The QM 1 continuously updates the status register 21 with current eligibility-status information according to either of the methods described with reference to FIG. 4 or FIG. 6. The contents of the status register are fed into the MPR guarantee block 25, along with the stream of TDQs being selected by the VPS 3 for service. The MPR block 25 generates the MPR-status vector. It does this by firstly continually tracking the rates at which each TDQ is being served by monitoring each TDQ-output that is generated by the MSB encoder 65 and fed back into the MPR block 25. The MPR block then compares the current service rates of each TDQ with the MPRs of the TDQs to continually update the MPR-status vector.

It is to be noted that the MPR block 25 makes use of the TDQ context memory 23 (shown in FIG. 8 but not shown in FIG. 9 in the interests of clarity) to carry out these operations.

At the same time, the contents of the TDQ status register 60 are also sent to the PPR guarantee block 26 which also calculates service rates using feedback from the MSB encoder 65. The PPR guarantee block 26 compares the service rates of TDQs to their respective PPRs in generating the PPR-status vector.

As mentioned previously, the FS block 27 is programmed to allow each TDQ to obtain its respective fair-share of the links connecting the switch to the downstream network elements. The FS block 27 does this by tracking the rates at which each TDQ is being served using feedback from the MSB encoder 65. The FS block 27 then divides each of the service rates it calculates by the total capacity of the link leading to the remote network element to obtain the share which a given TDQ is presently receiving. The FS block 27 compares the share being received by each TDQ to the fair share that the TDQ should be receiving. The FS block then generates an M-bit provisional FS-status vector. Bit-entries that are set high correspond with TDQs that are receiving smaller shares of the link-capacity than their respective fair shares. Bits that are set low indicate the associated TDQs are receiving at least their fair-shares. The provisional FS-status vector is then bitwise ANDed within the FS block, with the inputted PPR-status vector, to yield the FS-status vector. The ANDing ensures that bit-entries corresponding to TDQs being served at rates in excess of their respective PPRs, cannot be set high.

All three above mentioned M-bit-status vectors are simultaneously communicated by the TDQ status element 21 to the TDQ status encoder 22 at a predefined frequency. The TDQ status encoder 22 decides which of the three inputted status vectors will be fed into the MSB encoder 65 in accordance with the method described below.

If any of the TDQs are receiving a service rate that is less than its respective MPR, the MPR-status vector has at least a single 1-bit. Therefore, when the MPR-status vector is inputted into the OR gate 28, the control input 35 is driven high, which in turn allows the MPR-status vector to be passed through the MUX 31 to the exclusion of the two other status vectors. In this way, adherence to MPRs is given the highest priority in the scheduling algorithm implemented by the VPS 3.

If all the TDQs are receiving a service rate in excess of their respective MPRs, the MPR comprises 0-bits, the control input 35 sent by the OR gate 28 is driven low, and the MUX 31 therefore allows the MUX output vector_1 to pass through the MUX 31 and be output as MUX output vector_2.

If a TDQ has not been receiving its fair-share of the link, and has a service rate which has not exceeded its PPR, the FS-status vector has at least a single 1-bit. The output of the OR gate 29 is therefore driven high, which sets the MUX 30 to pass through the FS-status vector to the MUX 31 and subsequently to the MSB decoder 65. Assuming the MPR-status vector also comprises 0-bits, the FS-status vector is thus sent through the MUX 31 and into the MSB decoder 65. In this way, the granting of fair shares of the link to TDQs that are not being served above their PPRs, is given the second highest priority in the scheduling algorithm implemented by the VPS 3.

If none of the TDQs is receiving less than its respective fair-share of the link while not enjoying a service rate that exceeds its respective PPR, the fair-share mask is entirely comprised of 0-bits. The output of the OR gate 29 is driven low, which sets the MUX 30 to take output from the PPR block 26 as opposed to the FS block 27. Assuming the MPR-status vector also comprises 0-bits, the PPR-status vector is thus sent through the MUX 30, MUX 31 and into the MSB decoder 65. This allows any TDQ that is not receiving a service rate in excess of its PPR to be served, once the MPR and fair-share constraints have been satisfied for all TDQs.

The output of the MSB encoder 65 is the TDQ number corresponding to the most significant input bit that is set high. This number is sent to the QM 1 to initiate service for the corresponding TDQ, and to the blocks 25,26,27 to update the service rates of the TDQs.

It is to be noted that the above-described method implemented by the TDQ status encoder 22 results in the following priority-order with respect to TDQs receiving service. The highest priority is reserved for TDQs being served at rates less than their respective MPRs. The next priority is reserved for TDQs not being served at rates greater than their respective PPRs, and not receiving their fair share of the total switching capacity of the switch. The final priority is reserved for any TDQ that is not being served above its PPR.

It also is to be noted that within any of the above-mentioned priority levels, TDQs associated with more significant bits in the status vectors have priority with respect to TDQs associated with less significant bits.

The VPS 3 is thus able to effect flow control to ensure that the flows of traffic being provided to virtual ports on a remote network element both provide CPE sites with adequate levels of service and avoid overflowing the buffers on the remote network element.

The above-mentioned methods and apparatus yield a PS that can be applied to a variety of environments. The same PS can be adapted to serve in different packet switches that each have to support different feature-sets, by merely adding or removing the RS 2 and the VPS 3 to the QM 1. This easy and inexpensive adaptation is possible because the PS architecture is partitioned along service-lines.

At the same time, the PS architecture is also partitioned to allow for the preservation of much of the investment made in designing and optimizing the components, even as the feature-set of the overall PS changes. This is possible because the PS architecture is partitioned such that its constituent components are decoupled, the components only having to communicate with each other across very simple interfaces. The preservation of design-investments is possible because the partitioning also groups together on the same components, features that are likely to change at the same times. For example, the relatively unstable features of the RS 2 and the VPS 3 can be changed independently of one another within the PS of FIG. 1. For another example, the investment made in the relatively mature and stable features of the QM 1 can be preserved, notwithstanding the coming and going of a variety of different implementations of the RS 2 and the VPS 3.

Furthermore, the PS described above achieves these benefits without sacrificing any of the features or the performance found in conventional monolithic PS designs.

Numerous modifications and variations of the present invention are possible in light of the above teachings. It is therefore to be understood that within the scope of the appended claims, the invention may be practised otherwise than as specifically described herein. For example, the PS can be applied to all sorts of packet switches including Asynchronous Transfer Mode (ATM) switches. The credit count threshold, replenishments and replenishment intervals can be set to a variety of values. The service-priorities, whether the scheduler is implemented by the TDQ scheduler 7 or the VPS 3, can also be varied.

Figure 10:
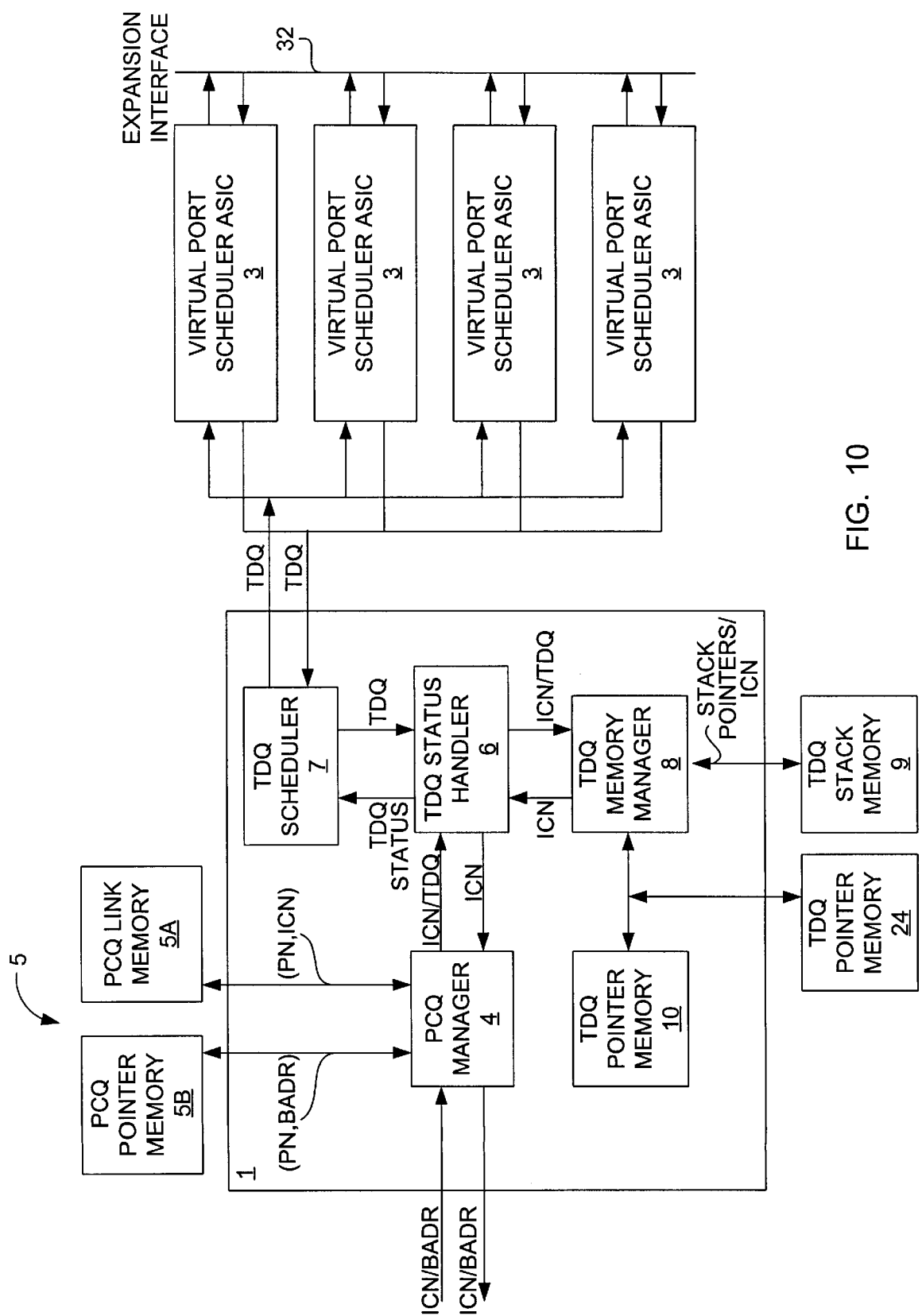
FIG. 10 is a block diagram of a variant of the PS of FIG. 8 in which a plurality of VPSs are connected to a single QM.

It also is possible to attach multiple VPSs 3 to a single QM 1, as shown in FIG. 10, in order to allow the PS to support a greater number of TDQs (i.e. more virtual ports). Each VPS 3 would interface with the QM 1 as contemplated in the above detailed description of FIGS. 8 and 9. However, each VPS 3 would only have control over a portion of the total bandwidth of the switch. The VPSs 3 are interconnected with one another under this embodiment, in order for them to collectively engage in a decision-making process that determines which VPS has control of the link at any given time. The communication required to implement this decision making process can take place across a standard bus 32 that connects all the VPSs 3. The bus can be a generic bus that carries messages between the VPSs 3, for example. Arbitration between requests from various VPSs 3 to obtain service for their TDQs, can be handled using a round-robin approach, or a strict fixed priority approach.

In the above described embodiments, PNs are associated with BADRs, and it is the PNs which are actually enqueued in PCQs. Of course any type of packet identifier could be used to achieve this purpose in the PCQ. For example, packet identifiers consisting of the BADRs themselves could be used.

I claim:

1. A packet scheduler for use in a packet switch having a cell memory, the packet scheduler comprising
   a queue manager hardware block (QM) for maintaining a queue of packet identifiers for each of a plurality of internal connection numbers, each packet identifier corresponding to a packet that is buffered at a respective buffer address of the cell memory within the switch, and for determining the time at which each buffered packet is to be transmitted from the switch, the QM having a switch interface for communicating internal connection numbers and buffer addresses to and from the packet switch; and
   the QM having a rate shaper interface for sending and receiving internal connection numbers and TDQ (traffic descriptor queue) identifiers.

2. A packet scheduler according to claim 1 further comprising a rate shaper hardware block (RS) connected to the QM through said rate shaper interface in order to add support for traffic shaping.

3. A packet scheduler for use in a packet switch having a cell memory, the packet scheduler comprising:
   a queue manager hardware block (QM) for maintaining a queue of packet identifiers for each of a plurality of internal connection numbers, each packet identifier corresponding to a packet that is buffered at a respective buffer address of the cell memory within the switch, and for determining the time at which each buffered packet is to be transmitted from the switch, the QM having a switch interface for communicating internal connection numbers and buffer addresses to and from the packet switch; and the QM having a virtual port scheduler interface for sending and receiving TDQ identifiers.

4. A packet scheduler according to claim 3 further comprising a virtual port scheduler hardware block (VPS) connected to the QM through said virtual port scheduler interface in order to add support for virtual port scheduling.

5. A packet scheduler according to claim 1 wherein the QM also has a virtual port scheduler interface for sending and receiving TDQ identifiers.

6. A packet scheduler according to claim 5 further comprising:

a rate shaper hardware block (RS) connected to the QM through said rate shaper interface in order to add support for traffic shaping; and a virtual port scheduler hardware block (VPS) connected to the QM through said virtual port scheduler interface in order to add support for virtual port scheduling.

7. A packet scheduler according to claim 1 wherein said packet identifiers are buffer addresses.

8. A packet scheduler according to claim 1 wherein said packet identifiers are packet numbers associated with buffer addresses by the packet scheduler.

9. A packet scheduler according to claim 1 wherein the QM comprises:

a per connection queue (PCQ) manager which upon receipt through said switch interface of the buffer address and internal connection number associated with a packet that has just arrived on the switch associates a packet identifier with the buffer address and for building and managing a PCQ for each internal connection number, a PCQ being a list of packet identifiers for packets on a given internal connection number which have been received but not yet transmitted;

a PCQ memory which holds the contents of the PCQs;

a TDQ manager which builds and manages a plurality of TDQs, a TDQ being a stack of ICNs which defines an order in which the PCQs will be served;

a TDQ memory which holds the TDQs;

a TDQ status handler for keeping track of which ICNs have at least one packet waiting to be dequeued; and a TDQ scheduler for deciding which TDQs will be served and at what times.

10. A packet scheduler according to claim 9 wherein the PCQ memory comprises a first memory that contains said lists of packet identifiers, and a second memory that contains the BADR values associated with each packet identifier.

11. A packet scheduler according to claim 9 wherein the TDQ scheduler comprises:

an M-bit wide status register each bit of which records an eligibility-for-service status for a respective TDQ, M being the number of TDQs supported by the PS;

an M-bit wide mask vector register whose contents are continually changing so as to provide only a subset of the TDQs with an opportunity to receive service at any given time;

a logical AND device which produces an output which is the status register bitwise ANDed with the mask vector register; and an M-to-1 most-significant-bit (MSB) encoder connected to the output of the logical AND device for producing an MSB output which identifies the next TDQ which is to be served.

12. A packet scheduler according to claim 11 wherein the TDQ memory comprises a first memory that contains the stacks of ICNs that comprise each TDQ, and a second memory that contains pointers to the stacks held in the first memory.

13. A packet scheduler according to claim 2 wherein the RS comprises:

a credit-count manager connected to the QM that keeps a credit-count for each ICN, decides based on the credit-count whether or not to instruct the QM to enqueue the ICN into its associated TDQ and adjusts credit-counts based on the enqueueing instructions it issues to the QM, a credit memory that is connected to the credit-count manager and that stores the present credit-count for each ICN;

a shaping manager that is connected to the ICN credit-count manager and that decides how often and by how much to replenish each ICN's credit-count;

a connection shaping memory that is connected to the shaping manager and that holds both the numbers of credits to be granted to each ICN per replenishment-interval and the desired length of each replenishment-interval;

a shaping time-slot memory that is connected to the shaping manager and that stores data structures used to calculate the actual replenishment intervals.

14. A packet scheduler according to claim 4 wherein the VPS comprises:

a TDQ status element that is connected to the QM and that generates three mask vectors indicating firstly which TDQs are being served at rates that are either less than their minimum packet rates, secondly which TDQs are being served at rates greater than their peak packet rates, and thirdly which TDQs are being served at rates less than their fair-rate relative to other TDQs;

a plurality of registers connected to the TDQ status element for storing values required for the TDQ status element to generate its mask vectors; and a TDQ status encoder connected to the TDQ status element for selecting which one or a combination of the mask vectors generated by the TDQ status element will be encoded to yield a TDQ to be sent back to the QM.

15. A packet scheduler according to claim 1 comprising multiple interconnected VPSs.

16. A method of scheduling packets comprising the steps of:

(a) maintaining a credit-count for each of a plurality of internal connection numbers (ICN);

(b) upon receipt of a buffer address and a particular ICN enqueueing a packet identifier that is associated with the buffer address in a per-connection queue (PCQ) that is associated with the particular ICN and enqueueing the ICN in an associated traffic descriptor queue (TDQ) only when another copy of the given ICN is not already enqueued on the TDQ, and when the ICN's credit-count is exceeding a predetermined threshold; and (c) dequeueing the given ICN from the TDQ by reading a packet identifier from the ICN's PCQ, looking up the BADR, and outputting the ICN and the BADR.

17. The method of claim 16 wherein the step of maintaining a credit-count for a given ICN comprises the steps of:

(a1) reducing the credit-count associated with the ICN every time that ICN is enqueued into its TDQ;

(a2) periodically replenishing the credit count of the given ICN using a predetermined number of credits that are to be granted per replenishment to the given ICN, and a predetermined desired replenishment interval for the given ICN.

18. The method of claim 17 wherein the replenishment interval is defined by populating with ICNs a time-space map comprising time-slots whose positions within the map correspond to unique times at which a credit-count can be replenished, and concurrently reading the contents of all the time-slots so that the credit-count of a given ICN is replenished only when a time-slot containing the given ICN is read.

19. The method of claim 18 wherein the given ICN is written into a time-slot which is N time-slots ahead of the last time slot that was read and that contained the given ICN, N corresponding to the desired replenishment interval for the ICN.

20. The method according to claim 16 further comprising the steps of:
   after dequeueing an ICN from a TDQ, determining from the ICN's PCQ if another ICN is waiting to be enqueued and if so, enqueueing that ICN into the associated TDQ.

21. The method according to claim 20 further comprising the steps of:
   periodically checking whether an ICN's credit count exceeds its predetermined credit threshold, and if so determining from the ICN's PCQ whether there are packets to enqueue, and if so enqueueing the ICN in its associated TDQ.

22. The method according to claim 20 wherein said step of dequeueing comprises the steps of:
   selecting a TDQ that is eligible for service;
   reading the ICN at the top of the selected TDQ;
   reading a packet identifier from the ICN and looking up the associated buffer address, and outputting the ICN and buffer address.

23. The method of claim 22 wherein said step of dequeueing further comprises the step of conditionally re-enqueueing another copy of the given ICN into the TDQ.

24. The method of claim 23 wherein all the TDQs are periodically-offered an opportunity to be served according to a round-robin algorithm.

25. The method of claim 23 further comprising the step of maintaining a status for each TDQ indicates whether or not the TDQ has at least one packet to dequeue.

26. The method of claim 25 wherein the step of the conditionally re-enqueueing another copy of the given ICN comprises the steps of:
   re-enqueueing the other copy only if the given ICN has other packet identifiers to dequeue, and if the credit-count associated with the given ICN exceeds a predetermined threshold;
   setting the status for the TDQ to true if the other copy is re-enqueued or if other ICNs are queued on the TDQ, and setting the status for the TDQ to false if the other copy is not re-enqueued and no other ICNs are queued on the TDQ.

* * * * *